Figure 24:
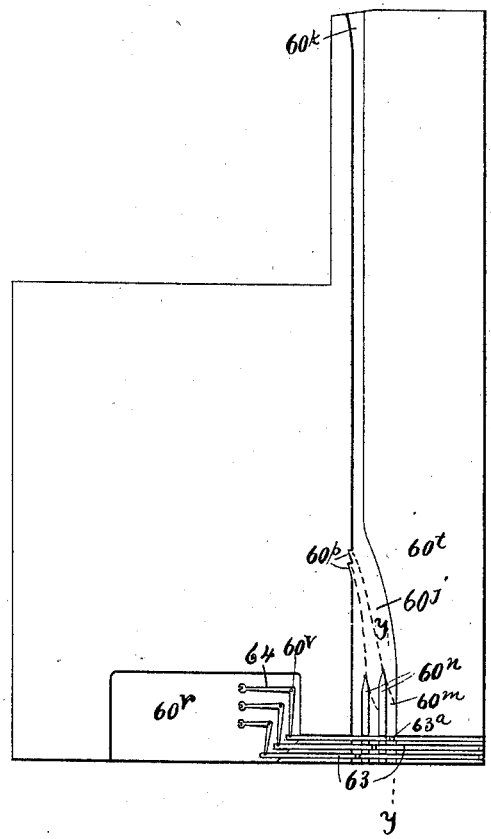

(No Model.)
15 Sheets—Sheet 1.
B. F. BELLOWS.
JUSTIFYING MECHANISM.
No. 598,622.
Patented Feb. 8, 1898.
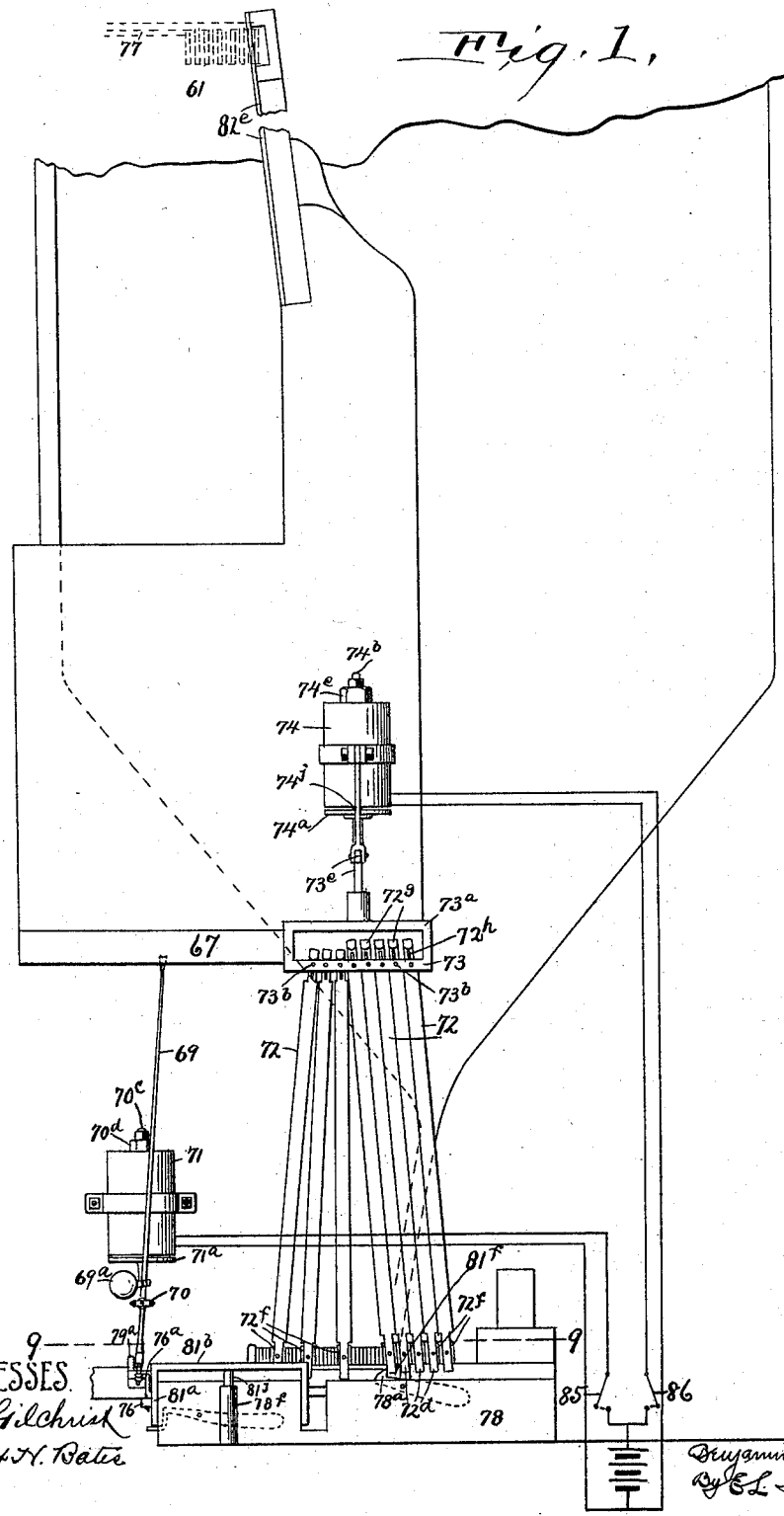
WITNESSES.
E. B. Gilchrist.
Albert N. Bates.
INVENTOR
Benjamin F. Bellows
By E. L. Thurston
his atty

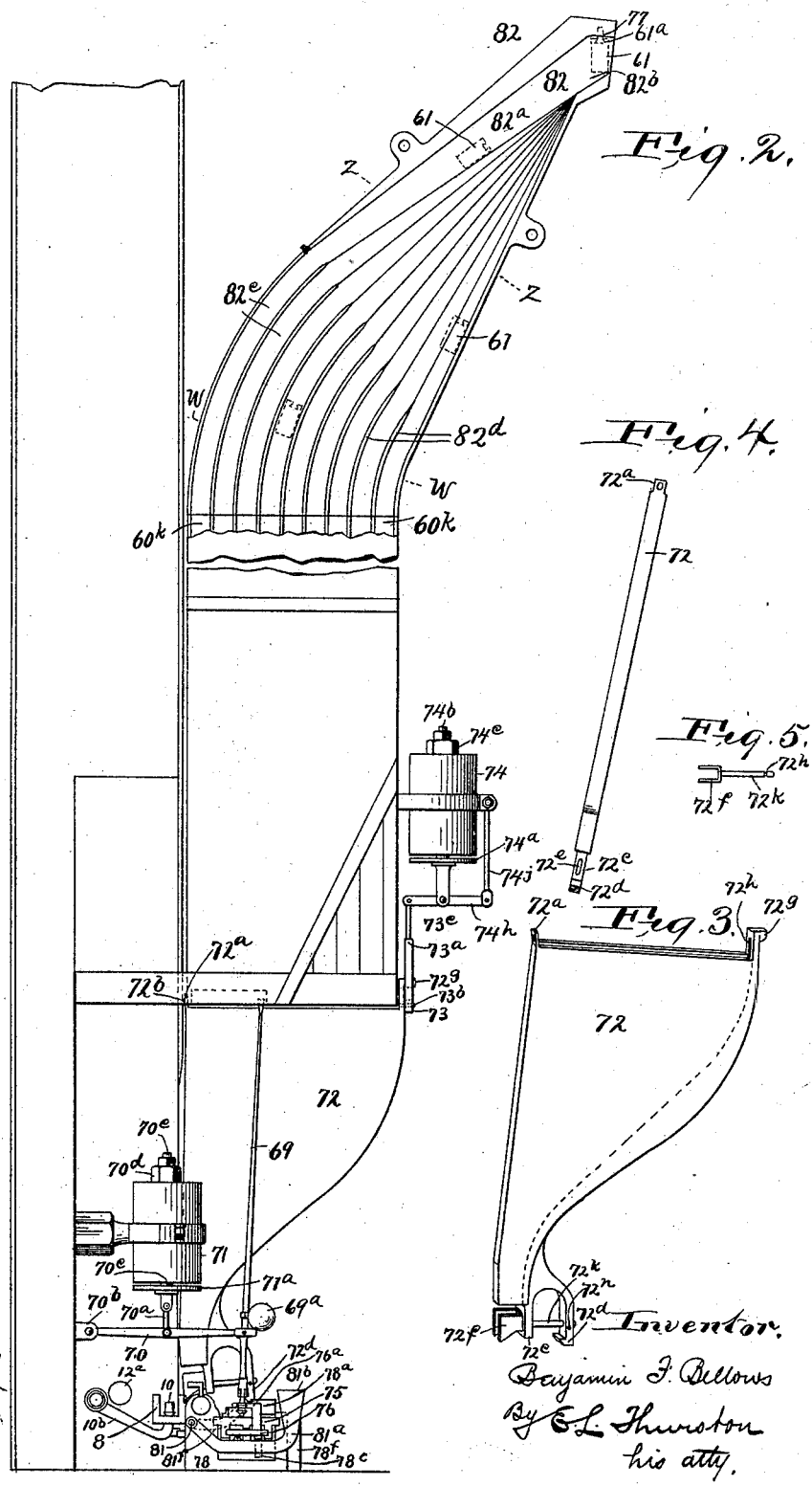

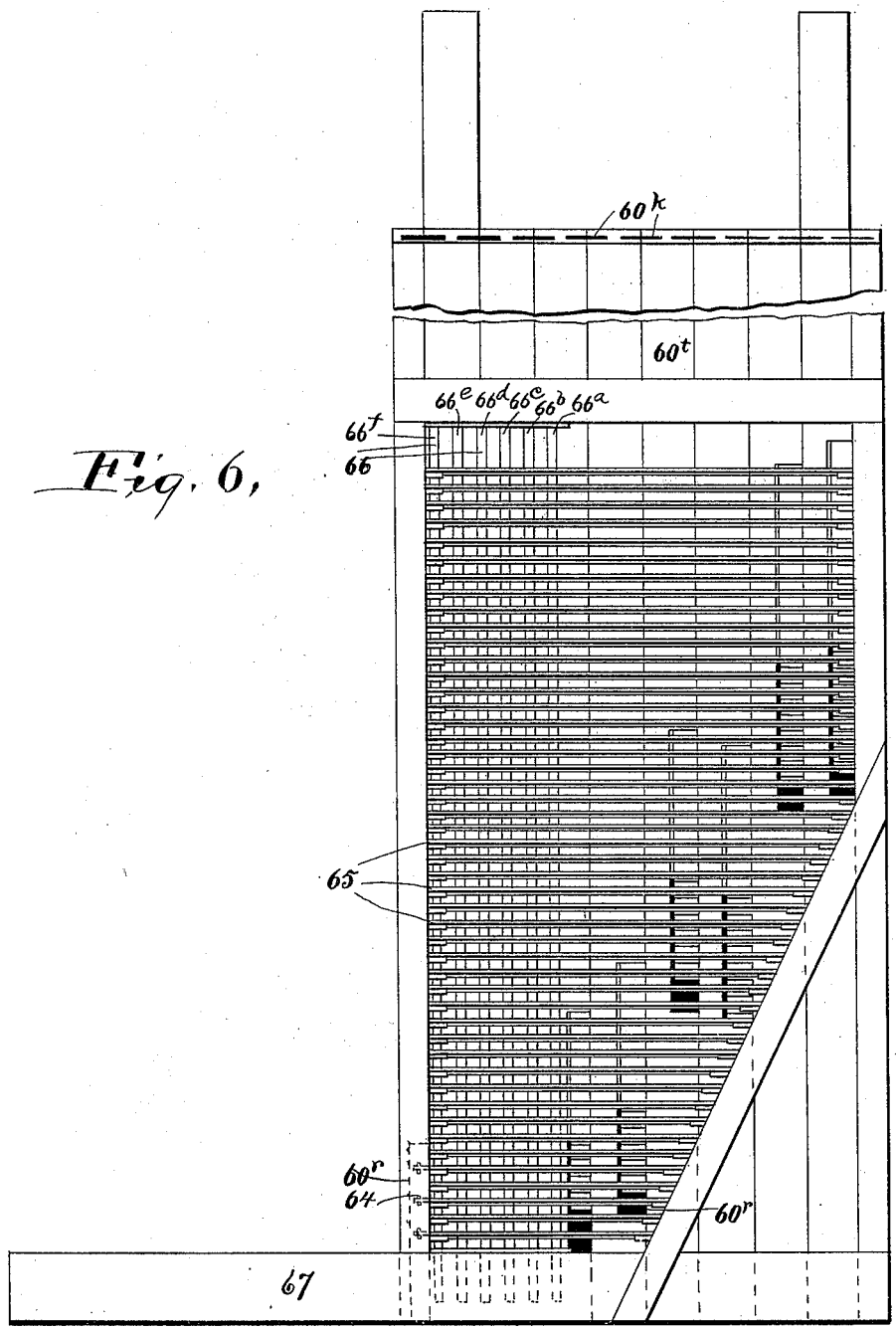

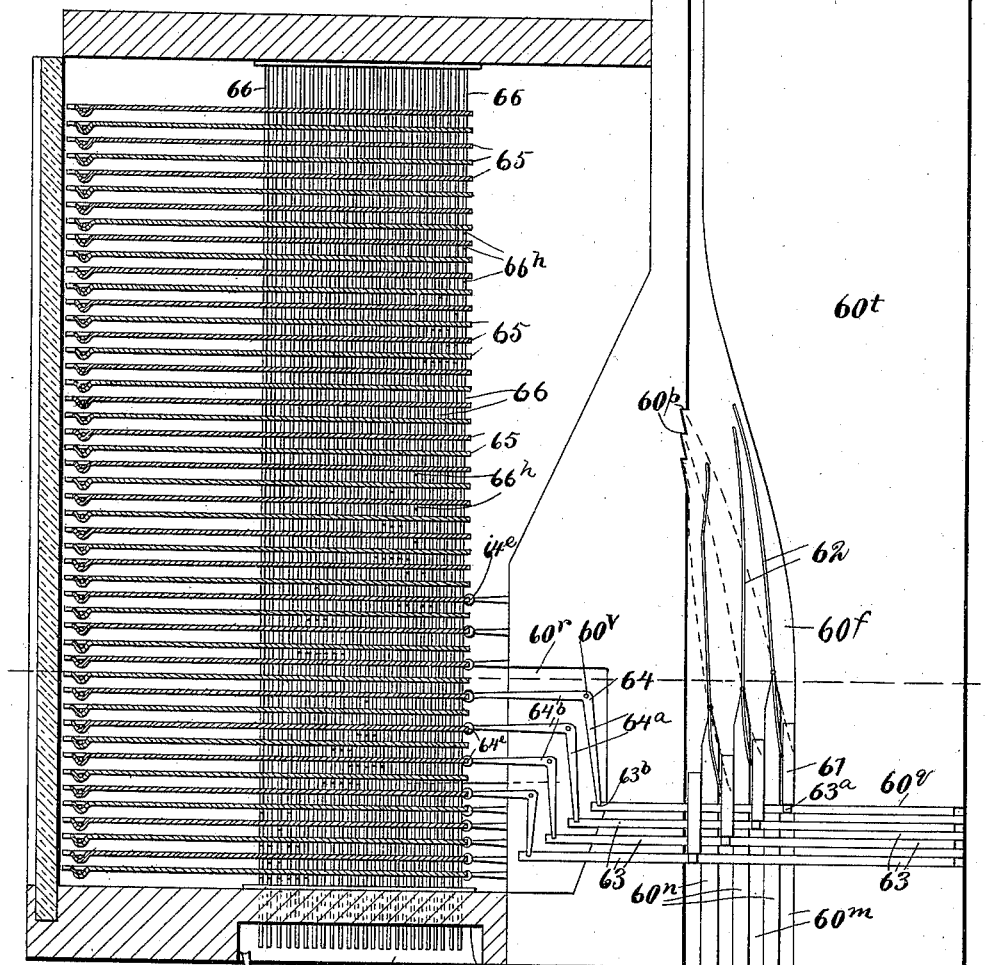

(No Model.)
15 Sheets—Sheet 5.
B. F. BELLOWS.
JUSTIFYING MECHANISM.
No. 598,622.
Patented Feb. 8, 1898.
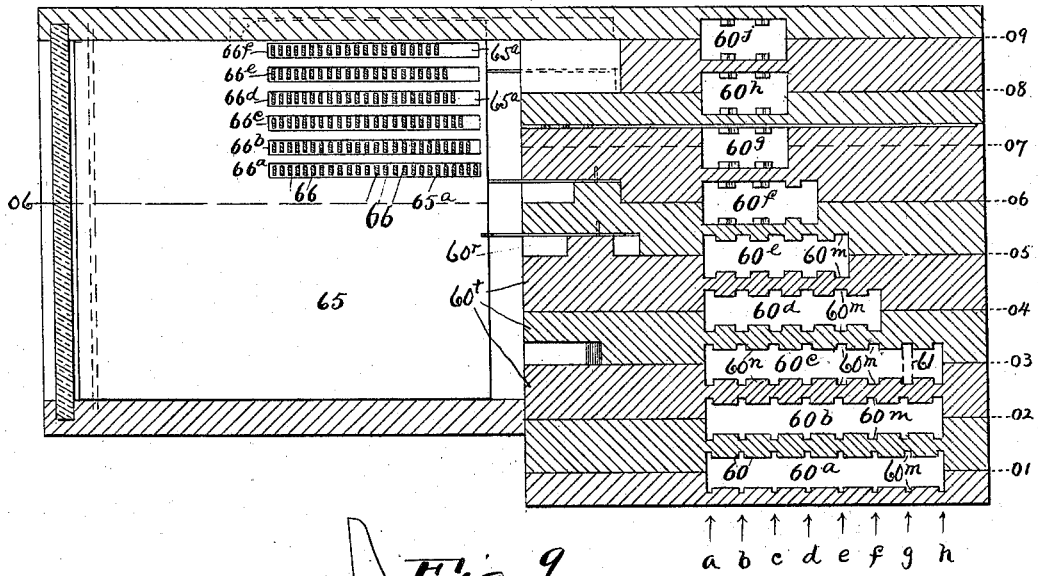
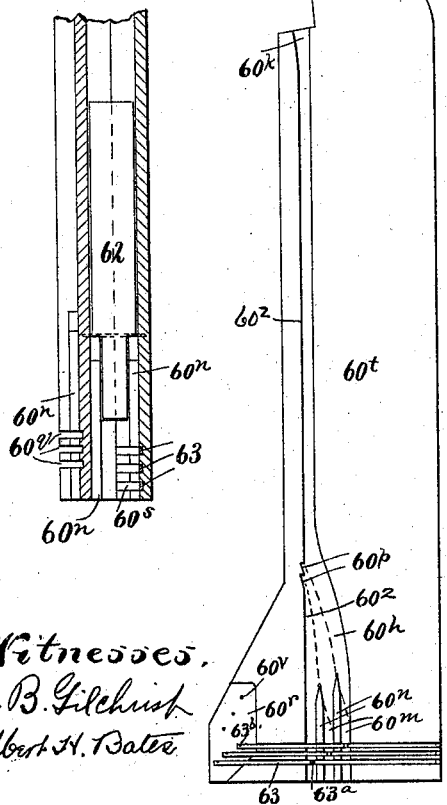
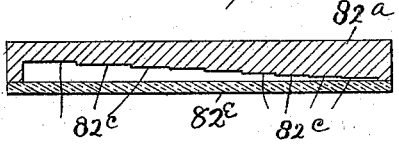
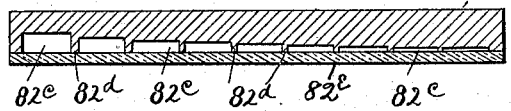
Witnesses.
E. B. Gilchrist
Albert H. Bates
Inventor.
Benjamin F. Bellows
By E. L. Thurston
his atty
THE NORRIS PETERS CO., PHOTO-LITHO., WASHINGTON, D. C.

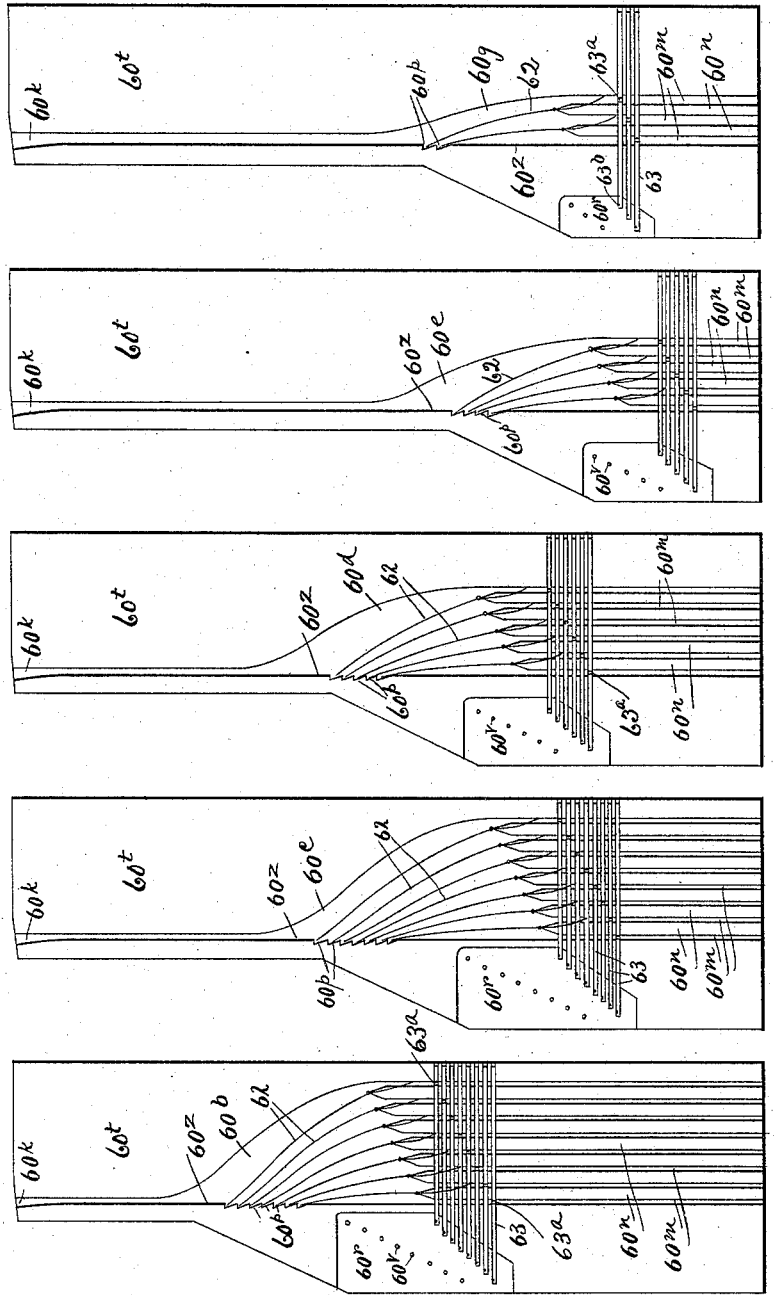

(No Model.)  
B. F. BELLOWS.  
JUSTIFYING MECHANISM.  
No. 598,622.  
15 Sheets—Sheet 7.  
Patented Feb. 8, 1898.
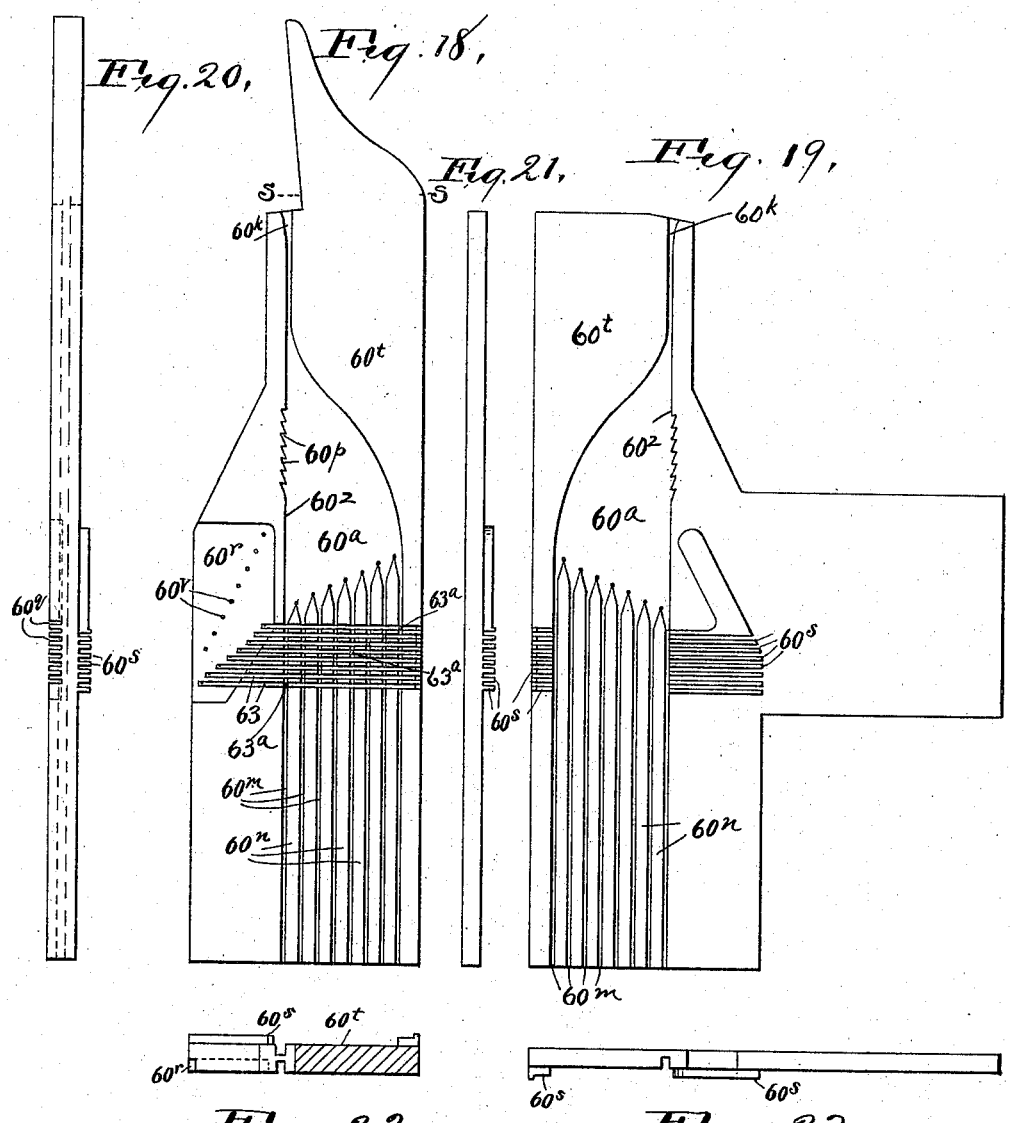
Witnesses.  
E. B. Gilchrist  
Albert H. Bates
Inventor,  
Benjamin F. Bellows  
By E. L. Thurston  
his atty.

(No Model.)  
15 Sheets—Sheet 8.

B. F. BELLOWS.
JUSTIFYING MECHANISM.

No. 598,622. Patented Feb. 8, 1898.

Witnesses.  
E. B. Gilchrist  
Albert H. Bates

Inventor,  
Benjamin F. Bellows  
By E. L. Thurston  
his atty.

(No Model.)  15 Sheets—Sheet 9.

B. F. BELLOWS.
JUSTIFYING MECHANISM.

No. 598,622.  Patented Feb. 8, 1898.

Witnesses.
E. B. Gilchrist
Albert H. Bates.

Inventor:
Benjamin F. Bellows
By E L Thurston
his atty.

(No Model.)  B. F. BELLOWS.  15 Sheets—Sheet 10.
JUSTIFYING MECHANISM.
No. 598,622.  Patented Feb. 8, 1898.

Witnesses.
E. B. Gilchrist
Albert N. Bates.

Inventor.
Benjamin F. Bellows
By E L Thurston
his atty.

(No Model.)  B. F. BELLOWS.  15 Sheets—Sheet 11.
JUSTIFYING MECHANISM.
No. 598,622.  Patented Feb. 8, 1898.

(No Model.)  
15 Sheets—Sheet 13.

B. F. BELLOWS.
JUSTIFYING MECHANISM.

No. 598,622. Patented Feb. 8, 1898.

Witnesses.  
E. B. Gilchrist  
Albert H. Bates

Inventor:  
Benjamin F. Bellows  
By E. L. Thurston  
his atty (No Model.)  B. F. BELLOWS.  15 Sheets—Sheet 14.
JUSTIFYING MECHANISM.
No. 598,622.  Patented Feb. 8, 1898.

(No Model.)

15 Sheets—Sheet 15.

B. F. BELLOWS.
JUSTIFYING MECHANISM.

No. 598,622.

Patented Feb. 8, 1898.

Witnesses.
E. B. Gilchrist
Albert J. K. Bates

Inventor:
Benjamin F. Bellows
By E. L. Thurston
his atty

UNITED STATES PATENT OFFICE.

BENJAMIN F. BELLOWS, OF CLEVELAND, OHIO, ASSIGNOR, BY MESNE ASSIGNMENTS, TO THE ELECTRIC COMPOSITOR COMPANY, OF WHEELING, WEST VIRGINIA.

JUSTIFYING MECHANISM.

SPECIFICATION forming part of Letters Patent No. 598,622, dated February 8, 1898.

Application filed January 26, 1897. Serial No. 620,812. (No model.)

*To all whom it may concern:*

Be it known that I, BENJAMIN F. BELLOWS, a citizen of the United States, residing at Cleveland, in the county of Cuyahoga and State of Ohio, have invented certain new and useful Improvements in Justifying Mechanisms; and I do hereby declare the following to be a full, clear, and exact description of the invention, such as will enable others skilled in the art to which it appertains to make and use the same.

The principal object of my invention is to provide novel mechanism adapted to be used in connection with matrix-assembling and type-setting machines, by means of which the proper number of spacers of the proper size may be mechanically inserted at the proper places in an assembled line of matrices or type, whereby said line of matrices or type will be accurately justified.

Another object of the invention is to sort the different-sized spacers and distribute them to their proper magazines, whereby they are in readiness to be again mechanically selected and inserted into the line of matrices and type.

The mechanism embodying my invention for effecting these objects, as shown, is part of a machine of which the ultimate object is to produce type-bars having on their printing edges any desired combination of characters. The particular machine of which the drawings show as much as is necessary to the understanding of the present invention is substantially the same as that which is fully described in my prior application, Serial No. 512,021, filed May 21, 1894. There is, however, no intention to limit my invention to use with that particular machine. On the contrary, I know of no reason why the mechanism hereinafter described may not be used in connection with any type-setting or matrix-assembling machine.

My invention herein described consists in the construction and combination of magazines, as described, in the construction, combinations, and subcombinations of parts contained in and constituting the mechanism whereby the proper number of spacers of the proper thickness may be released from their magazines and inserted at the proper places in a line of matrices or type to justify said line, and to the mechanism for sorting the different kinds of spacers and distributing them to the proper magazines and the channels therein, all of which are illustrated in the drawings and hereinafter described, and definitely pointed out in the claims.

Figure 25:
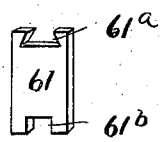
Figure 26:
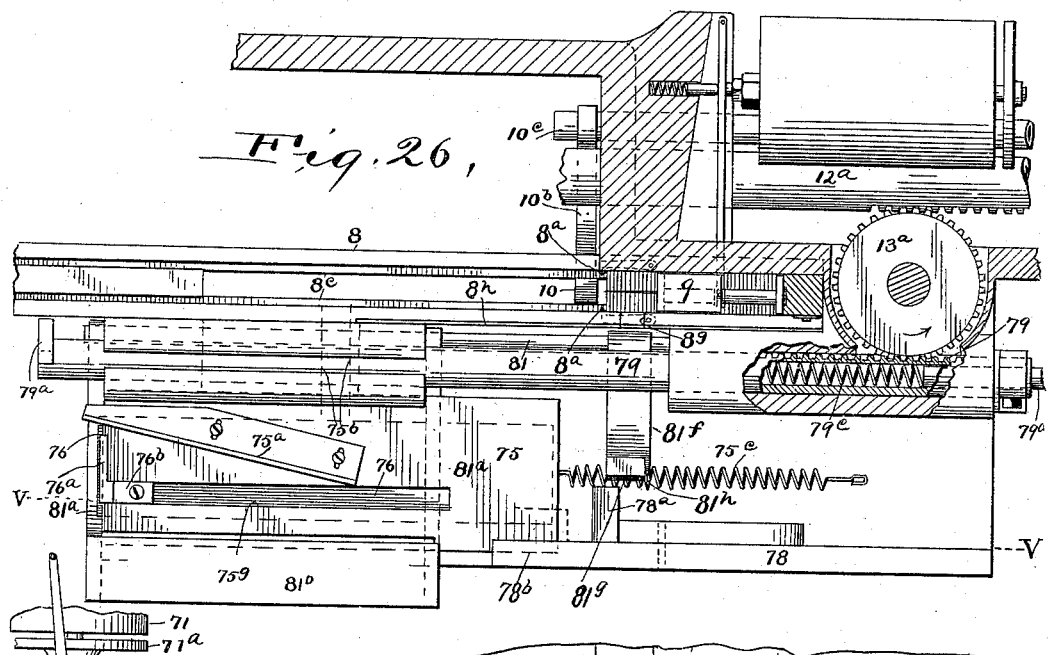

In the drawings, Figure 1 is a front elevation of my justifying mechanism and so much of a matrix-assembling machine like that shown in the prior application referred to as will show the proper position of the justifying mechanism relative thereto. As shown in this figure, a matrix-line is partially assembled. Fig. 2 is a left side elevation of the same mechanism before any of the matrix-line is assembled. Fig. 3 is a perspective view of one of the spacer-assembling tubes. Fig. 4 is a rear view of said tube. Fig. 5 is a detached plan view of the supplemental tube. Fig. 6 is a left end view of the magazines and their escapement-operating mechanism as said parts will appear when seen through the glass plate which constitutes the left end of the inclosing casing or box. Fig. 7 is a sectional front view on the line $0^6$ of Fig. 8. Fig. 8 is a sectional plan view of the same parts on the line $x\,x$ of Fig. 7. Fig. 9 is a front elevation of that plate $60^t$ which lies just behind the line $0^8$ of Fig. 8. Fig. 10 is a sectional right side view of the rear magazine on line $y\,y$ of Fig. 24. Fig. 11 is a sectional view of the sorter on line $z\,z$ of Fig. 2. Fig. 12 is a sectional view of the sorter on line W W of Fig. 2. Figs. 13, 14, 15, 16, 17, and 18 are front elevations of the plate $60^t$ which lie, respectively, behind the lines $0^2$, $0^3$, $0^4$, $0^5$, $0^7$, and $0'$. Fig. 19 is a rear elevation of the front plate $60^t$. Fig. 20 is a side elevation of the plate $60^t$, which is shown in Fig. 18, viewed from the right of said figure. Fig. 21 is a side view of the plate which is shown in Fig. 19, viewed from the left of said figure. Fig. 22 is a sectional plan view on line S S of that plate $60^t$ which is shown in Fig. 18. Fig. 23 is a plan view of the plate $60^t$, which is shown in Fig. 19. Fig. 24 is a front elevation of the rear plate $60^t$. Fig. 25 is a perspective view of one of the spacers. Fig. 26 is a sectional plan view on line $q\,q$ of Fig. 1, the spacer-assembling tubes being removed.

Figure 27:
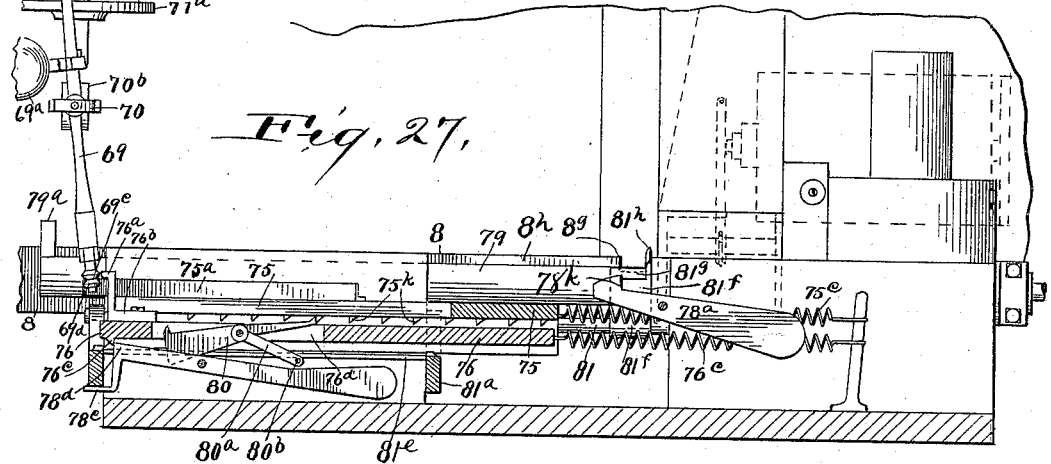
Figure 28:
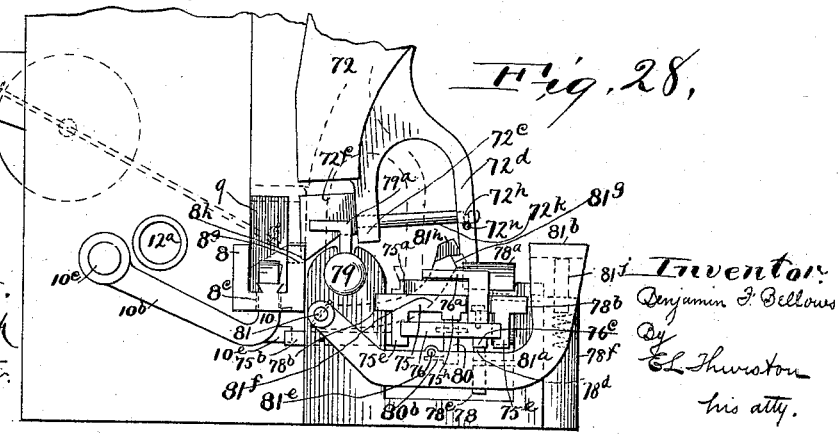
Figure 29:
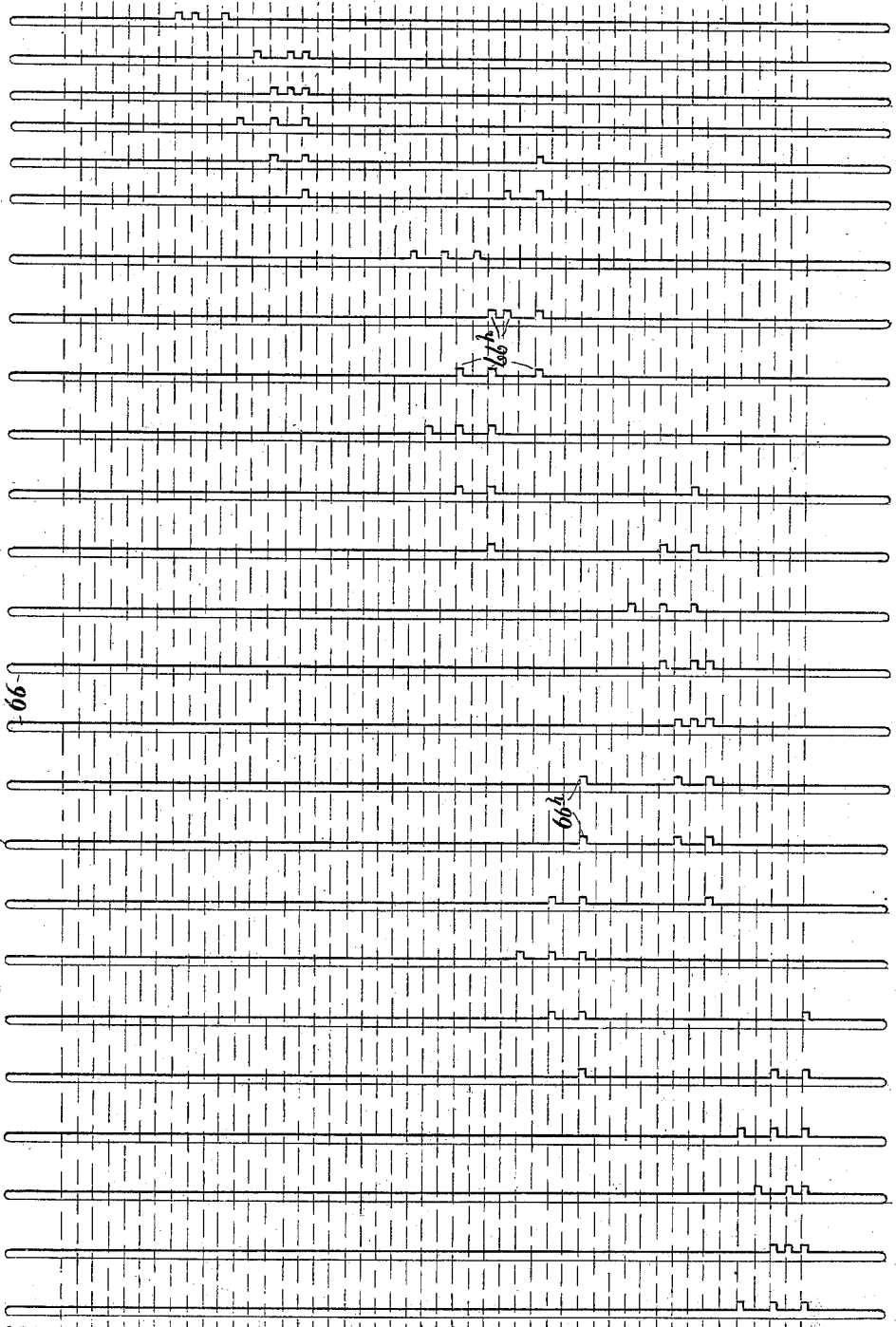

Fig. 27 is a sectional front elevation of the parts shown in Fig. 26 on line v v of Fig. 26. Fig. 28 is a left end elevation of the parts shown in Fig. 26. Fig. 29 is a view showing the construction of all the combination-rods which are arranged in the row $66^a$ of said rods, as shown in Fig. 8. Figs. 30, 31, 32, 33, and 34 represent, respectively, the combination-rods forming the rows $66^b$, $66^c$, $66^d$, $66^e$, and $66^f$.

The justification of the matrix-line is effected after all of the matrices (or type) are assembled by introducing between the words spacers of such thickness that they, together with the matrices, (or type,) will make the line of exactly the proper length. As the matrices or type are being assembled spacer-assembling tubes are introduced into the line in lieu of spacers, and when the line contains as many matrices or type as it will hold the proper spacers are automatically selected and released and dropped into the line through said tubes.

In order that the line may be properly justified under all possible conditions which will arise in practice, I propose to use nine different kinds of spacers 61, which differ from each other only in thickness. The matrices and the spacers are constructed on the "point" system. The thinnest space which I propose to use will be one point thick, the next size two points thick, and so on, the thickest spacer being nine points thick. I propose to provide for use eight spacers of each of the three thinnest sizes, six of the next size, five of the next size, four of the next size, and three of each of the three largest sizes. The thickness of the spacers, the number of different kinds, and the number of each kind which should be employed are matters of judgment which depend to some extent upon the size and style of the characters on the type or matrices. Any variation from the described construction in the particulars named is permissible without departing from the invention. After carefully considering the problem, however, I believe that by the use of the different kinds of spacers and the number of each kind, as above stated, I can justify lines for ordinary newspaper work made up of every possible combination of matrices or type of the common newspaper style.

Each spacer is provided in its top edge with a dovetailed notch $61^a$ and in its bottom with a notch $61^b$, which is not dovetailed; but except for these notches the spacers are rectangular pieces of metal of substantially the same size as the matrices employed and of equal thickness from top to bottom. These notches $61^a$ $61^b$ are useful in coöperation with certain mechanism, which is not shown, for separating the spacers from the matrices, but they have no function relating to their selection and assemblage. The mechanism for separating the matrices and spacers is not shown or described in this case, because it involves mechanisms having to do with the casting of type-bars from the assembled matrix-lines and which have nothing to do with the justifying mechanism. The dovetail notches $61^a$ are also useful in that they afford means whereby said matrices may be suspended on a dovetail tongue 77 and thereby moved from place to place or held in front of the mouth of the sorter, as shown in dotted lines in Figs. 1 and 2.

The spacers when not in use are stored in magazines, and there are as many of these magazines as there are kinds of spacers. Said magazines, which are indicated by the reference characters $60^a$ $60^b$ $60^c$ $60^d$ $60^e$ $60^f$ $60^g$ $60^h$ $60^j$, are arranged one behind another. Because of the construction of the device for sorting the different-sized spacers and delivering them into proper magazines, which device will be presently explained, the magazine for the smallest spacers is in front, that for the next smallest is just behind it, and so on, the magazine for the thickest spacers being in the rear. The mouths $60^k$ of these magazines are sufficiently large for the spacers to pass into them freely, and these mouths are arranged in line, one behind the other, below the delivery end of the sorter, as shown in Fig. 2.

Each magazine is divided at and near its lower end into as many vertical channels $60^m$ as there are spacers of the size which it is intended to contain. The channels in the several magazines are arranged in rows extending from front to back, as shown in Fig. 8, and indicated by the arrows $a\ b\ c\ d\ e\ f\ g\ h$. The series of magazines in the construction shown is formed of a series of plates $60^t$, of which all except the front and back plates are cut away on both faces. Wherefore when they are secured together, as shown, the recesses which constitute the magazines are formed between said plates. The front plate, Fig. 19, is in like manner cut away on its rear face, and the back plate, Fig. 24, is cut away on its front face. Either the right or left wall of each magazine-recess (in the present case the left wall $60^z$) is substantially vertical and in line with the corresponding side of the mouth $60^k$. The right wall curves away from the left wall until they are sufficiently separated and then extends in a substantially vertical direction downward. This gives the proper width to the several magazines for the desired number of spacer-channels $60^m$, the ribs $60^n$, which separate the channels, and the automatic mechanism for distributing the spacers to the several channels. The channels $60^m$ are formed by vertical ribs $60^n$ on the front and back walls of the magazine, which ribs extend approximately one thirty-second of an inch from the said walls. Wherefore their proximate faces are sufficiently far apart to permit the lower ends of the switch-levers 62 to operate between them. The sides of these ribs at their upper ends are beveled toward each other, as shown, for the purpose principally of enlarging the channels 60$^m$ and thereby facilitating the entrance of the spacers thereto.

At the tops of each pair of ribs 60$^n$ is pivoted a switch-lever 62, which projects above and below its horizontal pivot, the upper end being the longer and heavier. The upper ends of these levers, which are more or less curved, as shown, fall by gravity against the vertical walls 60$^z$ of the magazines, entering the notches 60$^p$ therein, their lower ends extending diagonally across the channels 60$^m$. Each of these switch-levers is very thin and light. Therefore the weight of a spacer upon its lower end automatically swings said lever to the position substantially as indicated in Fig. 7, in which position the lower end of the switch-lever passes and lies between the two ribs 60$^n$, to which it is pivoted. The center of gravity of said levers 62 never passes over the pivot. Therefore when the spacer is discharged from the channel the switch-levers fall by gravity against the vertical left wall, as shown in Figs. 13 to 17.

Figure 30:
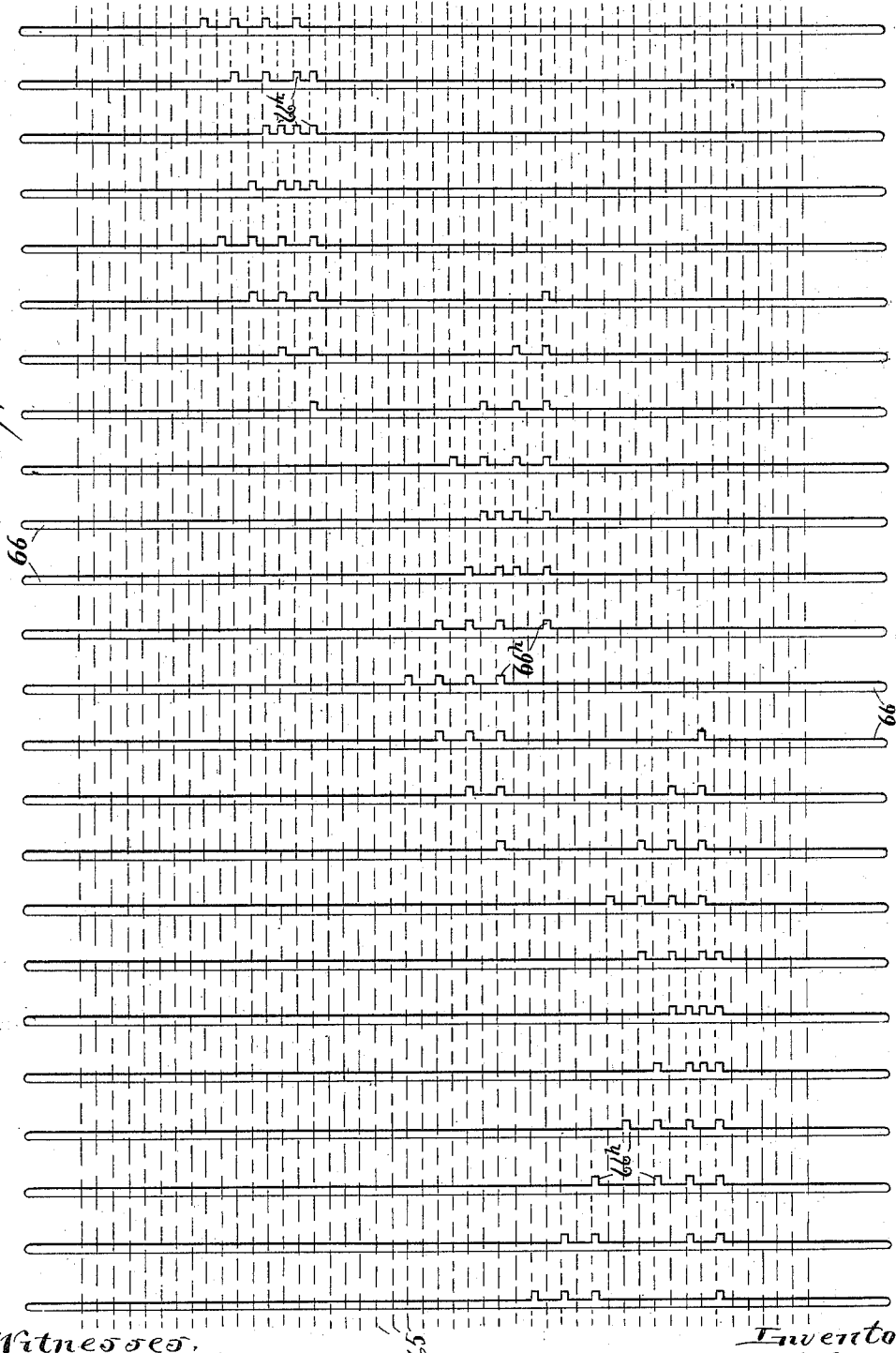
Figure 31:
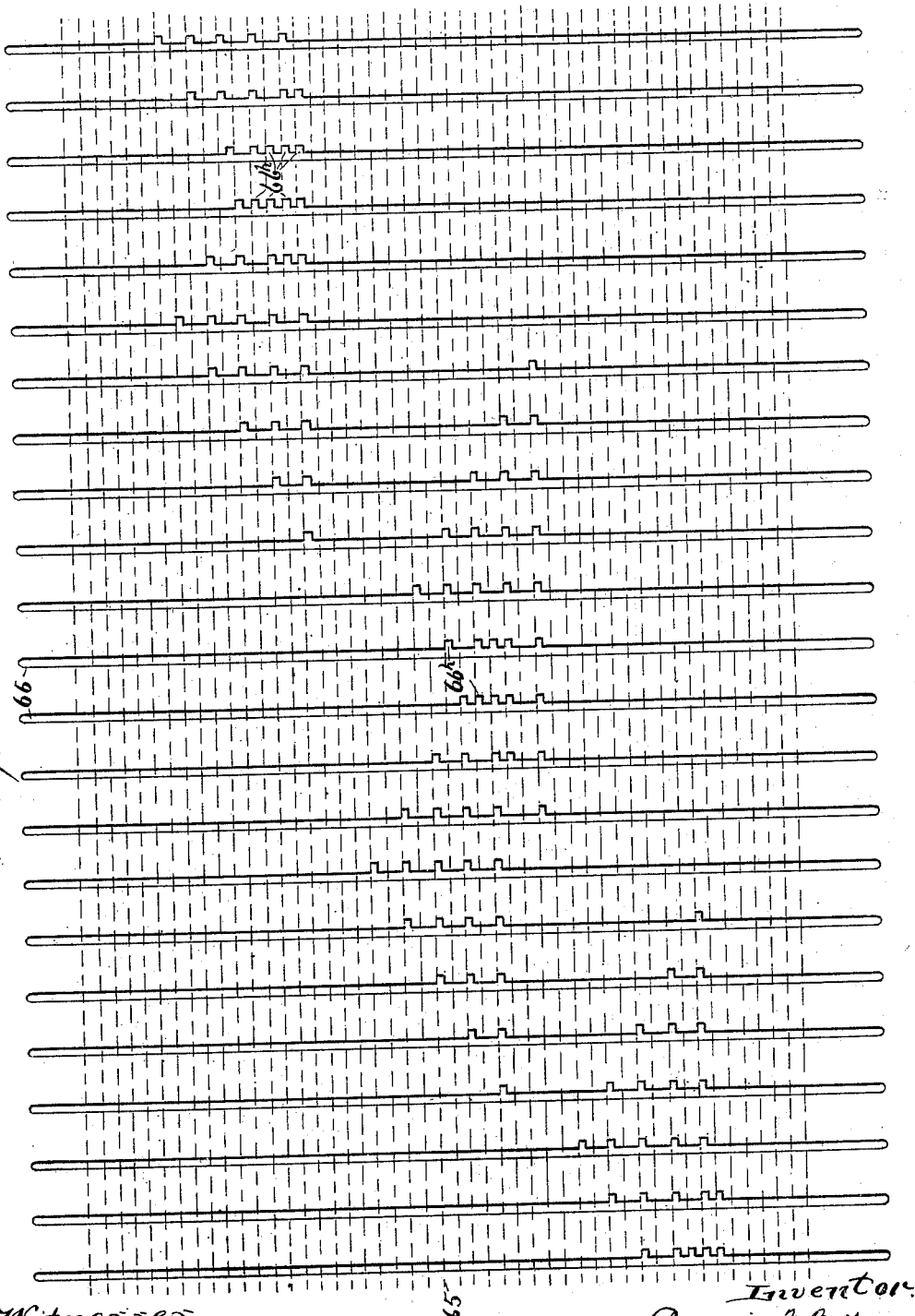
Figure 32:
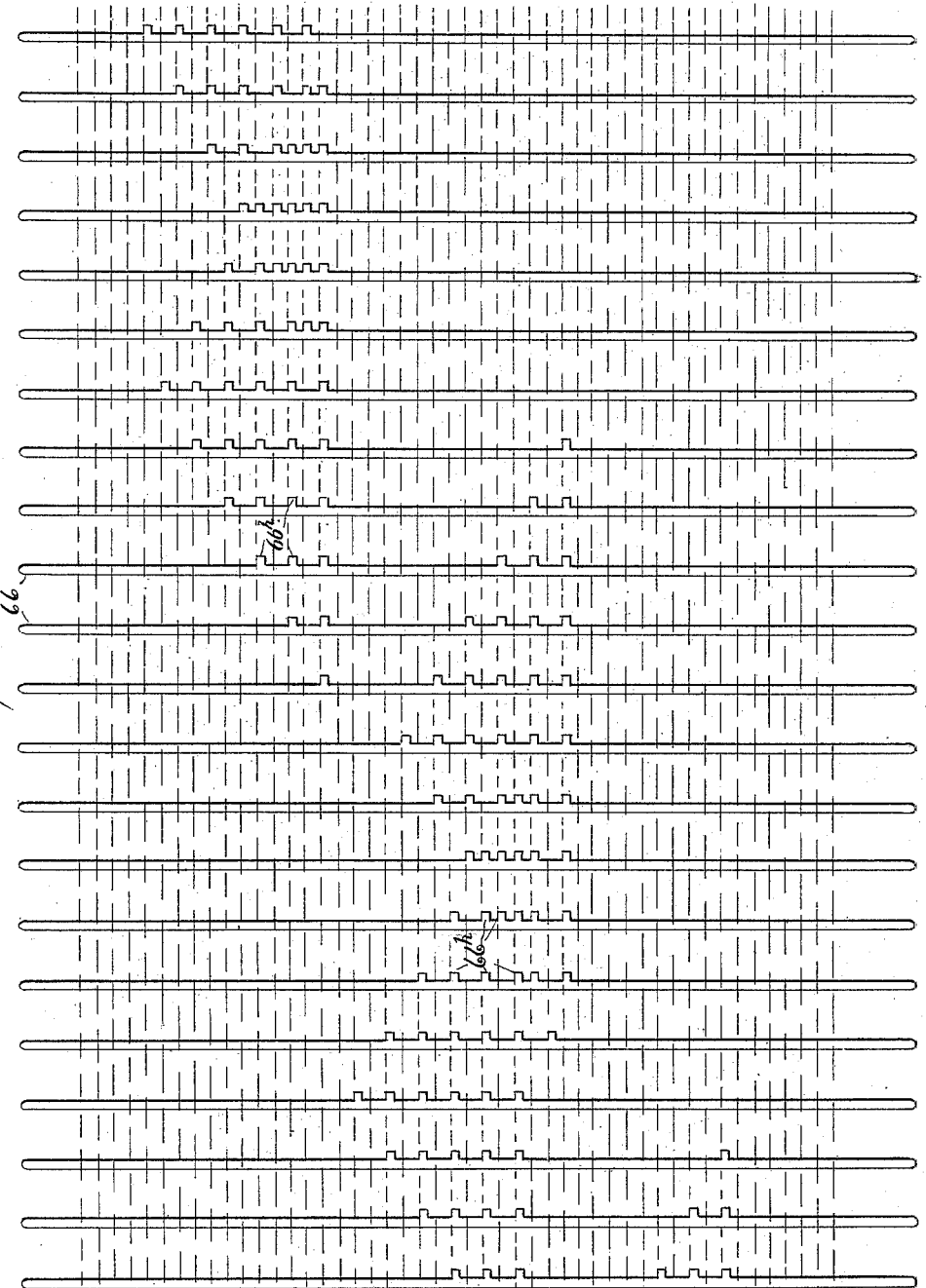
Figure 33:
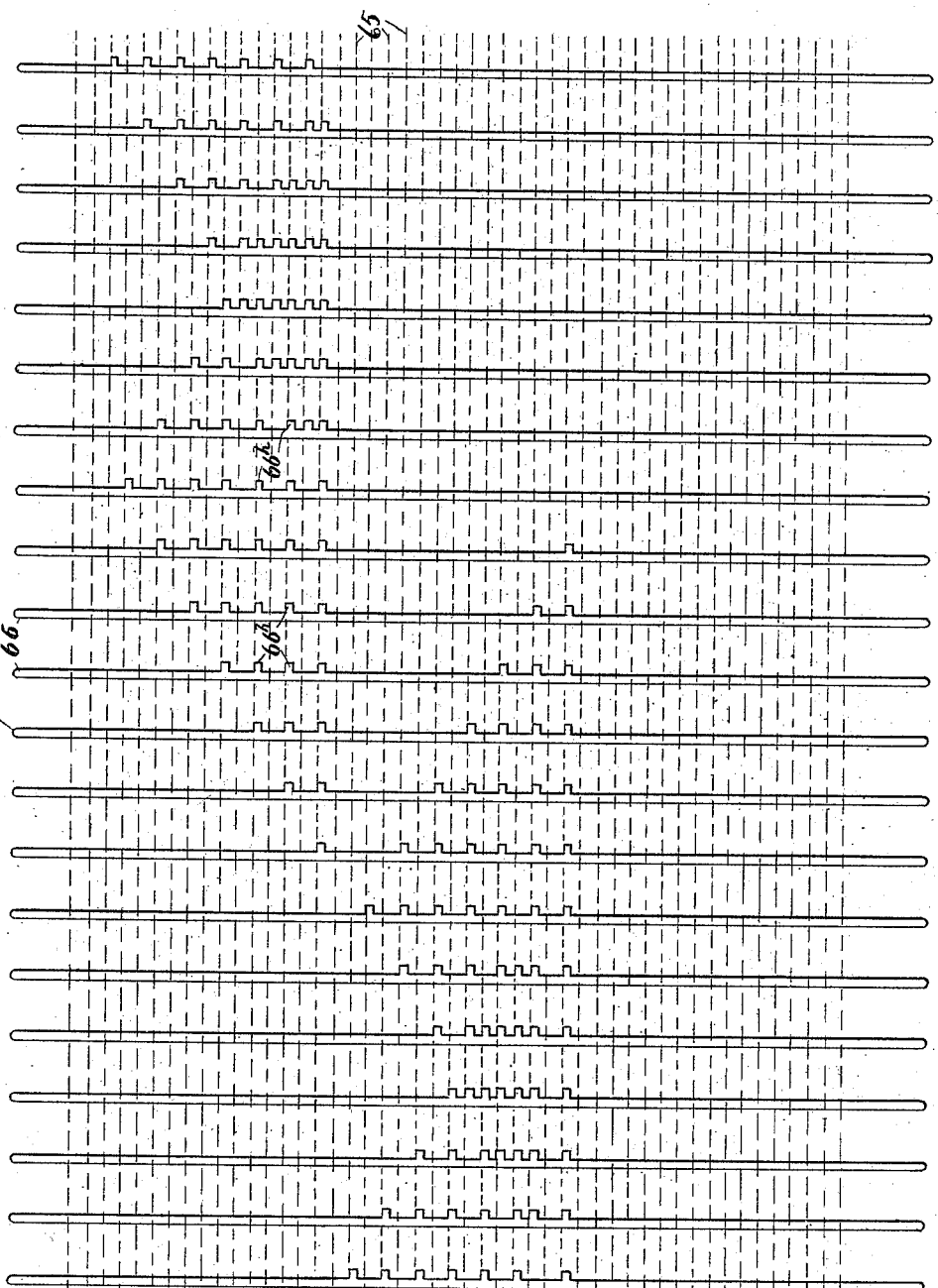
Figure 34:
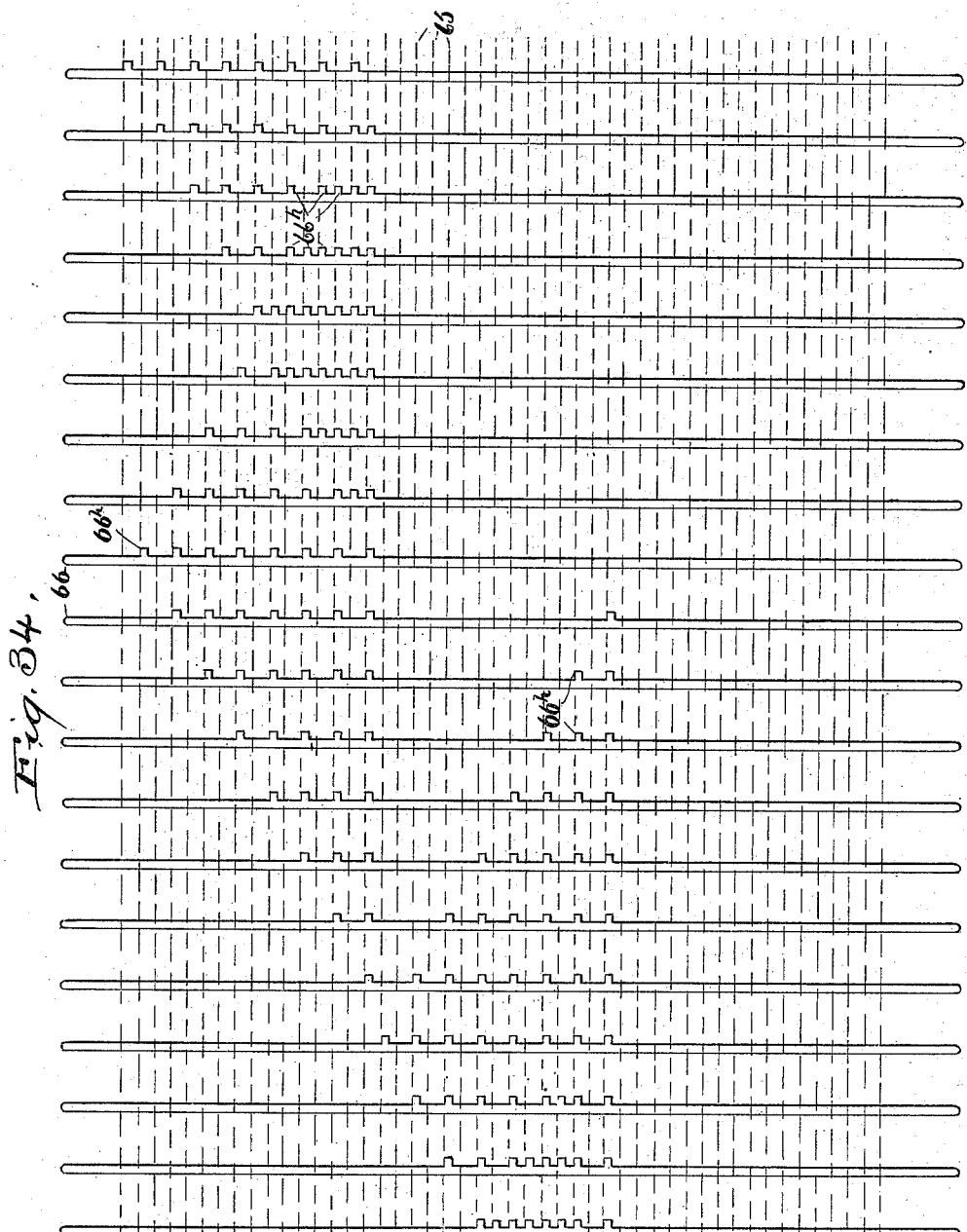

In either the front or back wall of each magazine—in the present case the back wall—there are as many horizontal grooves 60$^q$ as there are spacer-channels 60$^m$ in said magazine. In each groove is a slide 63, which is no thicker than the groove is deep at its shallowest part—to wit, where it crosses the channels 60$^m$—whereby it does not project into said channels. Projecting from the opposite wall of the magazine are the ribs 60$^s$, which bear against the slides and hold them in said grooves. On each slide is a finger 63$^a$, which projects into one of the channels. The finger on the upper slide projects into the right-hand channel 60$^m$, the finger on the next lower slide projects into the next channel, and so on through the series. The spacers in the several channels rest upon these fingers. When any slide is drawn to the left, its finger is withdrawn from beneath the spacer which it supports and said spacer falls. Thus by moving any slide in any magazine, or any combination of slides, the corresponding spacers are released. These slides constitute the escapement mechanism for the spacer-channels. By referring to Figs. 7, 9, 13 to 17, and 24 it will be noticed that these horizontal grooves 60$^q$ in all of the magazines are at different elevations. Each of the slides is moved by a bell-crank lever 64, the several levers being pivoted on pins 60$^v$ in recesses 60$^r$ in the plates 60$^t$ at the left of the magazine with which said levers are associated. The depending vertical arm 64$^a$ of each lever enters a notch 63$^b$ in one of the slides. The horizontal arm 64$^b$ of each lever lies in engagement with a rocker-plate 65, the edge of said plate entering a notch 64$^c$ in said lever-arm. There are as many of these rocker-plates as there are bell-crank levers, and they lie in approximately horizontal planes, one above another, and are pivoted to a fixed support on horizontal pivots which engage with their left-hand edges. Six slots 65$^a$, extending from near their right edges toward their pivots, are formed in each of these plates, the corresponding slots in all of the plates being in the same vertical plane. Through these slots pass six rows of vertically-movable combination-rods 66. These rods are guided at their upper and lower ends, the lower ends passing through the fixed lower guide-plate 67. On each of these rods are from three to eight laterally-projecting fingers 66$^h$, which lie beneath and engage with different rocker-plates. It is obvious, therefore, that when any one of these rods is moved upward from three to eight of the rocker-plates are rocked upward, thereby causing the rocking of the corresponding levers 64 and the consequent movement of the associated slides 63, whereby the corresponding spacers are released. In Figs. 29 to 34 are shown in detail the construction of all of these rods, of which, as will be seen, there are one hundred and thirty-five. The rods shown in Fig. 29 are the rods which constitute the front row 66$^a$ of rods which pass up through the front slots 65$^a$ in the rocker-plates, as shown in Fig. 8, their order of arrangement from left to right being the same in both figures; but their position relative to each other is changed, because each rod is here shown as if turned one-quarter of a revolution on its vertical axis for the purpose of showing the fingers 66$^h$. Fig. 30 in like manner shows the rods constituting the second row 66$^b$ from the front. Fig. 31 shows the rods constituting the third row 66$^c$. Fig. 32 shows the rods constituting the fourth row 66$^d$. Fig. 33 shows the rods constituting the fifth row 66$^e$, and Fig. 34 shows the rods constituting the sixth row 66$^f$. The horizontal dotted lines in said figures indicate the position of the several rocker-plates 65 relative to said fingers. By the use of these one hundred and thirty-five vertically-movable rods for operating the rockers it is believed that all of the different combinations of spacers which it will ever be necessary to use to justify any matrix-line which can be formed by any combination of the matrices may be released. One hundred and thirty-five different combinations of spacers may be released, one combination at a time, and inserted in the matrix-line. Any one of these rods may be moved upward to cause the operation of the corresponding combination of rockers by a push-rod 69. This push-rod is supported by a universal joint on the end of the pivoted arm 70. This arm is pivoted on a fixed bracket 70$^b$ and is connected by a link 70$^a$ with the armature 71$^a$ of a fixed electromagnet 71. The downward movement of this armature is limited by the engagement of the nut 70$^d$ with the top of the magnet. This nut is secured to the end of a rod 70$^c$, which slides freely through the core of the magnet and is connected at its lower end with the armature. The arm 70 is moved upward to operate the push-rod when the circuit of the magnet is completed. The upper end of the push-rod is slightly cupped, so that it may effectually engage with the lower ends of the combination-rods. The push-rod is moved as the matrix-line is assembled, so as to bring it beneath that one of the rods 66 which when raised will release the proper number of spacers of the proper thickness and from the proper channels to complete the line by mechanism which I will presently describe. Before describing this mechanism it is perhaps advisable to explain the theory upon which the mechanism operates.

I have assumed that it will never be necessary to introduce into a line to complete it more than eight spacers, whatever be their width. I have also constructed the mechanism so that it is not adapted to introduce into the line less than three spacers. In this respect the mechanism may be varied at pleasure. Short lines of matter must be approximately completed by blank matrices, which are assembled in the line in precisely the same manner that the matrices bearing the characters are assembled. All of the rods 66 which are in the front row $66^a$ have three (and only three) fingers $66^h$. The rods in the next row $66^b$ have each four fingers. The rods in the next row $66^c$ have five fingers; in the next row $66^d$, six; in the next row $66^e$, seven, and in the next row $66^f$ eight.

The normal length of a newspaper line is 2.16 inches. The longest single syllable in the English language is believed to be the word "wrought," which in the style of type I prefer to use (nonpareil) fills .3751 of an inch in said line. The shortest line of composition which must ever be justified with the mechanism herein described is therefore the difference between the normal line and the length of this word.

In order that the push-rod 69 may be moved so that it can be beneath any one of the combination-rods 66, it must have two motions—to wit, backward and forward from one line of combination-rods 66 to another, so that the proper number of spacers can be released, and left and right, so that the spacers so released shall be of the proper thickness. The universal joint by which the push-rod is connected with the arm 70 permits these two movements.

It is evident from the foregoing statement of the plan of operation that no movement of the push-rod 69 need take place until at least three words are assembled in a line and until the matrices assembled shall occupy a space as great as the short line just described. When three words and the two spacer-tubes have been assembled, then for every additional spacer which the line requires the push-rod must be moved backward. Before the push-rod is moved at all its upper end lies in the left corner of a recess $67^a$ in the under side of the plate 67, being held there by the weight $69^a$ or other equivalent means. When the third spacer-assembling tube is added to the line, the push-rod is moved back into the plane of the front line $66^a$ of combination-rods, and as each additional spacer-tube is added to the line said push-rod is moved back the distance between two adjacent rows of combination-rods. The push-rod does not begin to move to the right until the matrices alone in the assembled line fill a space equal to the "short line." Thereafter for each addition of a matrix to the line the said push-rod moves to the right a distance proportionate to such addition. Before explaining in what manner the push-rod receives these two movements I will explain the construction whereby the spacers when released are introduced at the proper points in the matrix-line. By examining Fig. 8 it will be seen that the spacer-channels $60^m$ in the several magazines are arranged in rows, (indicated by arrows $a\ h$,) one channel behind another. The three left-hand rows $a\ b\ c$ of spacer-channels include one channel for every size of spacer—that is to say, one channel in each magazine. The fourth row $d$ from the left contains spacer-channels which hold only the six smallest size spacers—that is to say, channels of the six front magazines. The next row $e$ contains channels holding the five smallest kinds of spacers. The next row $f$ contains four channels holding the four smallest kinds of spacers, and the last two rows $g\ h$ on the right contain channels which hold only the three smallest kinds of spacers. Suspended below these several rows of spacer-channels are spacer-assembling tubes 72, which are shaped substantially as shown in Fig. 3—that is to say, they are narrow, about one-fourth of an inch wide viewed from the front or back. The upper end, which is open, extends beneath all of the magazines, so that a spacer released from the corresponding channel in any magazine will drop into said tube. The front wall of this tube curves backward and downward toward the rear wall. These tubes may be somewhat loosely described as funnel-shaped. There are eight of these tubes provided. The left-hand tube has its open mouth directly beneath the left-hand row $a$ of magazine-channels. The next tube to the right has its open mouth below the next row $b$ of magazine-channels, and so on through the series. On the rear edge of each of these tubes is a substantially vertical lip $72^a$, in which is formed a hole which receives a loose-fitting horizontal pin $72^b$, which projects rearward from the rear face of the rear plate $60^t$, whereby the rear end of the tube is supported and permitted to move, as hereinafter described. At the upper front edge of each tube is a horizontal lip $72^g$, which extends over a bar 73, and a vertical slot $72^h$ in the front wall of each tube receives a pin $73^b$, projecting rearward from this bar 73. Each of the tubes is constructed as above described, and the bar 73 lies beneath the front lips $72^g$ of all of them. This bar is the lower member of a rectangular frame, the upper member $73^a$ of which is connected by a link $73^c$ with a lever 74$^h$, which is pivoted to the lower end of a swinging link 74$^j$. This lever is pivotally connected with the armature 74$^a$ of an electromagnet 74. This armature is connected to the lower end of a rod 74$^b$, which passes through the core of the electromagnet 74, and a nut 74$^c$ is secured to the upper end of said rod, whereby the movement of the armature from the magnet is limited and the said rectangular frame is supported.

On the lower end of each tube are two depending ears 72$^c$ 72$^d$, of which the rear ear 72$^c$ is provided with a vertical slot 72$^e$. A supplemental tube 72$^f$, which is open on its rear side, has secured to its front side a cylindrical rod 72$^k$, which passes through the said slot and enters a hole, in which it fits loosely, in the front ear 72$^d$. An annular groove 72$^h$ is formed in said rod, into which a pin 72$^n$ projects. This construction permits the supplemental tube to be moved up and down slightly upon the connection between the rod 72$^k$ and the front ear 72$^d$ as the pivot. This rod may also turn upon its axis. Therefore the supplemental tube may maintain a vertical position even when the tube itself is inclined.

The assembling-trough 8, into which the matrices fall as they are released from their magazines, is provided with a notch 8$^g$ in its front wall just in front of the assembling-spout, which notch is sufficiently deep to permit the supplementary tubes 72$^f$ to pass into the assembling-trough when released by the retaining-escapement. A longitudinal groove 8$^h$ is cut in the front edge of the assembling-trough. Under normal conditions the spacer-assembling tubes are swung to the right and are prevented from swinging to the left by a pawl 78$^a$, which is pivoted to the block 78 and engages with the front ear 72$^d$ on the left assembling-tube, which tube is directly in front of said notch 8$^g$ in the assembling-trough, and the lower rear edges of the supplemental tubes are supported in the groove 8$^h$ in the front upper edge of the assembling-trough. Said tubes are released one by one by escapement mechanism which I will presently explain. These tubes when released fall by gravity rearward, the supplemental tubes 72$^f$ entering the assembling-trough through said notch 8$^g$. One of these assembling-tubes is released and permitted to enter the said assembling-trough in the manner just described whenever a space is required in the line. As soon as a tube is in the trough it is moved to the left past the retaining-pawls 8$^a$ a distance equal to its width—viz., one-quarter of an inch—and as more matrices are added to the line the line, including the tubes, is moved to the left in the same manner and a distance equal to each addition. The line may be thus moved by a plunger 9, working in the trough substantially like the plunger described in said prior application or by any appropriate mechanism. It is evident, therefore, that when all of the matrices are assembled in said line the spacers may be added thereto by dropping them from their magazine-channels into said tubes, through which they will fall by gravity into the assembling-trough. When the spacers have been so introduced, the circuit of the magnet 74 is completed, whereupon the bar 73 is drawn upward, thereby lifting the front edge of said tubes 72 and withdrawing the supplemental tubes 72$^f$ from the assembling-trough, the beveled lower front edge of said supplemental tubes facilitating this withdrawal. Because the rear side of the supplemental tubes are open the spacers remain in the trough. The tubes 72 are then swung to the right to the position first described, where the left tube is engaged by the pawl 78$^a$ by the following mechanism:

79 represents a rack-bar mounted in suitable bearings in block 78 and movable longitudinally to the right and left. The rack on this bar engages with the pinion 13$^a$, which may be revolved through any suitable connection with the motive power. Therefore when said pinion is revolved it moves the rack-bar 79 to the right. On this bar is a finger 79$^a$, which engages with the left supplemental tube 72$^f$, and as this bar moves to the right it pushes all of said tubes before it, swinging them upon their supports, until the left-hand tube passes over the pawl 78$^a$, which is carried up by the weight of its right end until its tooth 78$^k$ engages with the ear 72$^d$ on said left assembling-tube. This rack-bar 79 is hollow for a greater part of its distance, and it telescopes over a fixed rod 79$^d$, which enters said bar from the right-hand end thereof. A long coil-spring 79$^c$ is contained in this hollow rack-bar, and it is compressed as said bar is moved to the right. When the power to revolve the pinion 13$^a$ is withdrawn, the rack-bar is moved to the left by its spring 79$^c$, just described, the said pinion 13$^a$ revolving loosely during these movements until said rack-bar 79 returns to its normal position, as shown in Fig. 26.

I will now describe the mechanism shown for imparting to the push-rod 69 the two movements hereinbefore referred to.

The described movements of the upper end of the push-rod result from the action upon the lower end of said push-rod of two plates 75$^a$ 76$^a$, which are secured, respectively, upon two slides 75 and 76. These plates and slides are constructed and operated as follows: The slide 75 is mounted in suitable ways 78$^b$ in the block 78, which is secured upon the bedplate, and it is movable in a horizontal path to right and left. A contractile spring 75$^c$ exerts its force to draw said slide to the right to the end of its path. The plate 75$^a$ is secured on said slide near the left end thereof. The operative front face of this plate is vertical, but is set inclined to the path of the slide. An arm 75$^b$, which projects rearward from the slide, lies in the path of an arm 10$^e$, which projects forward from the detent 10 when it is in the assembling-trough. This detent is in the upturned end of an arm $10^b$, which is rigid with a longitudinally-movable rod $10^c$, which is under spring-pressure tending to draw it to the right. This detent enters a slot $8^c$ in the bottom of the assembling-trough, and it bears against the left matrix in the line and is consequently moved to the left as the line is assembled. This detent is a feature of the machine described in said prior application. These two arms $75^b$ and $10^e$ are relatively so placed that the arm $10^e$ is moved into contact with arm $75^b$ when the assembling line (matrices and spacer-tubes) in the trough is as long as the short line. The slide 76 lies below the slide 75 and is movable in grooves in the ribs $75^e$, which extend downward from the slides 75, near the front and rear edges thereof, or in any other suitable guide-grooves. The plate $76^a$, the left operative face of which is vertical and in a plane at right angles to the path of said slide, is secured to the slide by means of a foot $76^b$, which passes through a longitudinal slot $75^g$ in the slide 75. The plate $76^a$ lies above the inclined plate $75^a$. Therefore said inclined plate may pass under it. On the lower part of the push-rod 69 are two V-shaped contact-pieces $69^c$ $69^d$, with which said plates $75^a$ $76^a$ will engage, as hereinafter set forth. On the under side of this slide 75 is a rib $75^h$, having ratchet-teeth $75^k$ on its lower edge. A pallet-lever 80 is pivoted to the slide 76, in a longitudinal slot $76^d$ therein. The left end of the pallet-lever is heavier than the right end. Therefore said right end is normally held up in engagement with the said ratchet-teeth $75^k$. The distance between these ratchet-teeth is equal to the thickness of the supplemental tubes—in the present case, one-quarter of an inch. A contractile coil-spring $76^c$ exerts its force constantly to draw the slide 76 to the right; but the engagement of the said pallet-lever 80 with said ratchet prevents the said slide from moving to the right independently of slide 75. Two curved arms $81^a$ pass under the slides 75 76, and their rear ends are rigidly secured to a rock-shaft 81, which is mounted in the said block 78. A plate $81^b$ extends between and is connected with the front ends of said arms. These arms and plate constitute the space-key, which is held up in the position shown in Figs. 1, 2, and 28 by a spring-actuated pin $81^j$, which is movable in a vertical socket $78^f$ in front of the block 78 and engages with the under side of the space-key bar $81^b$. An arm $80^a$ is rigid with the pallet-lever 80, and it carries a horizontal pin $80^b$. A rod $81^e$, which is secured to the two arms $81^a$, lies just over and in contact with said pin $80^b$. Pivoted to the block 78 underneath the slides is a pawl $78^d$, which is normally held in the path of a tooth $76^c$, which projects downward from the slide 76. An arm $78^e$, which is connected with this pawl, lies below the left arm $81^a$ of the space-key, whereby when said space-key is depressed the pawl $78^d$ is withdrawn from its engagement with said tooth $76^c$. Therefore the slide is permitted to move to the right, and is so moved by its spring, provided the slide 75 is also released or the pallet-lever 80 is disengaged from the teeth $75^k$.

The operation of the slides and associated parts in so far as they have to do with the movement of the push-rod 69 is as follows: When the slide 75 is released by the detent 10, both slides move to the right under the influence of their springs. The slide 75 moves as far as possible against the ends of the ways $78^b$, and the slide 76 moves until the tooth $76^c$ engages with the pawl $78^d$, which is not, as we shall presently see, the limit of its possible movement to the right. The matrices are assembled in the trough and the line is moved to the right, moving the detent 10 before it, after each addition to the line, a distance equal to such addition by suitable means—as, for example, the means for the purpose which is shown in Figs. 26, 27, and 28 and fully explained in the prior application referred to. After each word one of the assembling-tubes is released and the supplemental tube enters the trough. The construction of these tubes has been explained, and the means for releasing them will be presently explained. It is sufficient for the present to say that this result is effected by the depression of the space-key $81^b$. After each tube is introduced the entire line is moved to the left one-quarter of an inch, which is exactly the thickness of said tubes. The first time the space-key is operated it moves the pawl $78^d$ and disengages the tooth $76^c$ on the slide 76. It also operates the pallet-lever 80, whereupon the said slide 76 is released and is moved by its spring backward relative to the slide 75 the distance between two ratchet-teeth—to wit, one-quarter of an inch. Every other time the space-key is operated it operates the pallet-lever, with the result above stated. When the line including the spacer-tubes is as long as the short line, the detent-arm $10^e$ engages with the arm $75^b$, and thereafter for each addition to the line the detent moves the slide 75 to the left with it, and the slide 76 partakes of this movement whenever a matrix is added. When this movement of the slide 75 begins, the slide 76 has been moved to the right of its normal position as many quarter-inches as there are spacer-tubes in the line, because the pallet-lever 80 has been operated that many times. When enough matrices have been assembled in the line to fill a short line, the slide 76 will have been returned to its normal position, and both of the plates $75^a$ $76^a$ on the slides will then be in contact with the contact-pieces $69^d$ $69^c$ on the lower part of the push-rod. The inclined plate $75^a$ is so placed that if at this time three spacer-tubes have been added to the line the upper end of the push-rod will have been moved into the plane of the front row $66^a$ of combination-rods by the action of said plate $75^a$ upon the lower end of said push-rod. The inclination of the plate $75^a$ is such that when the slide 75 moves to the right one-quarter of an inch independently of the slide 76 the upper end of the said push-rod will be moved backward the distance between two rows of combination-rods. When both slides move together, as they do when matrices are added to the line, the upper end of the push-rod is not moved backward, but is only moved to the right, and for each matrix when it is added to the line after a short line of matrices are assembled the upper end of the push-rod is moved to the right a distance proportionate to the width of said matrix by the action of the plate 76ª against its lower end. If four words fill the line, the upper end of the push-rod will be beneath some combination-rod in the front row of such rods, because the line then contains three spacer-tubes. Which rod in said row the push-rod will be under depends upon the amount of space in the line which the matrices alone fill. If now the push-rod is moved upward by the arm 70 or any other suitable mechanism, it will lift the said combination-rod, and the three fingers thereon will operate the three rocker-plates, which will cause the release of three spacers of the proper thickness to justify the line. These spacers drop into the three spacer-tubes, whereby they are conveyed into the assembling-trough. If, however, four words do not fill the line, another assembling-tube is released and enters the trough 8. The operation of the space-key for this purpose operates the pallet-lever 80, temporarily releasing the engagement between the two slides. The slide 76 moves to the right one-quarter of an inch independently of slide 75. Then the matter in the trough is moved to the left a quarter of an inch, whereby both slides move to the left one-quarter of an inch, and this returns the slide 76 to the position from which it had just been moved, while the slide 75 is to the left of its previous position one-quarter of an inch. The result of these movements is substantially as if the slide 76 did not move at all when a spacer-tube is added to the line, while the slide 75 did move to the left a distance equal to the width of such tube. This movement of said slide 75 relative to the slide 76 causes the push-rod to be moved backward under the second row 66$^b$ of combination-rods 66, but said push-rod is not moved to the right or left at all. The addition of more matrices to the line causes the push-rod to move a proportionate distance to the right under said row of combination-rods. These operations are repeated until another syllable cannot be added to the line. The operator then completes the circuit of the magnet 71, which may be done by a suitable switch, (indicated at 85.) This operates the lever-arm 70 and causes the push-rod to move up against the rod 66 above it, which rod is thereby raised, with the result of releasing the proper spacers. Three, four, five, six, seven, or eight spacers are released, depending upon the row of combination-rods under which the push-rod stands. The width of said spacers depends upon the position in said row in which it stands. The fingers upon said combination-rod are arranged to operate the proper rocker-plates 65 and the proper number of such plates to effect this result. When three spacers are released, one of said spacers is released from each of the first three rows $a\ b\ c$ of magazine-channels on the left. The fourth spacer is released from the fourth row $d$, and so on. When this result has taken place, the circuit of the magnet 71 is opened by the operation of the switch and the lever-arm 70 falls, carrying with it the push-rod 69. When the spacers have been delivered into the trough 8, the circuit of the magnet 74 is completed by any suitable switch, (indicated at 86,) whereupon the bar 73 is drawn upward. This raises the front ends of the assembling-tubes and withdraws the supplemental tubes from the assembling-trough. Following this result the detent 10 is withdrawn from the trough and the pinion 13ª is set in motion, the result of this latter action being that the assembled line is moved by push-rod 12ª to the left, substantially as described in said prior application, out of the trough 8 and onto whatever support is provided to receive it. In a machine for casting a type-bar it would be moved toward the casting mechanism. At the same time the assembling-tubes are moved to the right by the bar 79 until the left tube passes the pawl 78ª. The circuit of the magnet 74 is then opened by its switch.

The escapement for releasing the assembling-tubes consists of an escapement-arm 81$^f$, secured to the right end of the rock-shaft 81. Secured to the front end of this arm is a vertical finger 81$^g$, which normally lies behind the front ear 72$^d$ of the left tube 72, between it and the notch 8$^g$ in the assembling-trough, and prevents the supplemental tube from entering the assembling-trough through said notch. Another finger 81$^h$ at the right of the finger 81$^g$ is formed on the arm 81$^d$, and the front edge of this finger is sharpened, so that it may pass between the ears 72$^d$ on the left tube 72 and that one next to the right of it. When the space-key is depressed, it rocks the rock-shaft 81, and this draws the finger 81$^g$ downward and releases the left tube 72, which tube thereupon swings backward by gravity, its supplemental tube 72$^f$ entering the assembling-trough through the said notch 8$^g$. Before this tube is released the finger 81$^h$ enters between it and the next tube and prevents this second tube from moving to the left until the finger 81$^g$ has returned to a position which will prevent the passage through the notch 8$^g$ of the said second tube. When the finger 81$^h$ is withdrawn, the remaining tubes fall by gravity to the left until the left-hand tube is stopped by the pawl 78ª. This action is repeated every time the space-key is depressed. After the assembled line of matrices or type has been used the spacers are separated from the matrices or type and are delivered one at a time into the mouth 82ᵇ of the sorter 82 for sorting out the different sizes and delivering them into the proper magazines. Prior to delivering the spacers into the mouth of the sorter they may be suspended by means of their notches 61ᵃ on a dovetail tongue 77, and they may be pushed one by one into the mouth of the sorter by hand or by suitable mechanism. This sorter includes a plate 82ᵃ, having in one face as many grooves 82ᶜ as there are magazines—in the present case eight. The plate is secured on top of the plates 60ᵗ, which form the magazines. The said grooves at their lower ends are separated by ribs 82ᵈ from each other, and each is directly above the mouth of the corresponding magazine. The grooves extend upward and forward, converging and being merged together at the mouth of the sorter. While all of these grooves are inclined to a vertical plane, the nearer the front the more nearly vertical they are. These grooves are of different depth to conform to the thickness of the spacers, the shallowest groove being in front, and are progressively deeper from front to back. Across the grooved face of this plate a smooth plate 82ᵉ, preferably of glass, is secured. The upper end of the sorter is inclined toward the left, so that a spacer in any of the grooves will slide against this smooth plate. The spacers may be introduced one by one into the mouth of the sorter by any suitable means. Preferably they are suspended by the dovetail notch 61ᵃ from a dovetail tongue 77, from which they are pushed by hand or any suitable mechanism into the mouth of the sorter. As they enter the sorter they slide down by gravity upon the plate 82ᵉ, and since they tend to fall in as nearly a vertical path as possible they will find their way into the groove 82ᶜ nearest the front, which will receive them. In other words, they will fall down into the particular groove in which they fit. The thinnest spacer will slide down in the front groove, the next thinnest in the next groove, and so on. The spacers will consequently be delivered into the mouths of their corresponding magazines.

I have not shown the means for withdrawing the detent from the trough nor for setting the pinion 13ᵃ in operation. The means contemplated are substantially the same as shown in my prior application; but so far as the present invention is concerned the operator might withdraw the detent by hand, and the pinion might be revolved by any suitable mechanism. Neither have I shown in detail the switches for completing the circuits of the electromagnets 71 and 74. They are merely indicated and any form of switches may be used. In fact, any suitable means may be substituted for the electromagnets to perform their functions. The operator might even move the lever-arm 70 and the bar 73 by hand, if he so desired.

The mechanism herein described is of practical value only when used with a type-setting or matrix-assembling machine; but I see no reason why it may not be used with any machine of that character. The particular mechanism which will be employed for lifting the tubes 72ᶠ out of the trough and for returning the tubes 72 to their normal position, for moving the push-rod 69 upward, for withdrawing the detent, and for accomplishing certain other incidental but necessary results will be adapted to the machine with which my present invention may be used.

My present invention relates to the described mechanism whereby the proper number of spacers of the proper width may be inserted at the proper places in a line of matrices or type, whereby said line is justified, and to the construction whereby the spacers may be sorted and distributed to their proper magazines.

Having described my invention, I claim—

1. The combination of a plurality of spacer-magazines containing spacers of different thicknesses, independent escapement mechanisms for severally releasing the said spacers, assembling-tubes adapted to receive the released spacers, and mechanism for severally introducing the discharge end of said tubes into the assembling line of matrices, and mechanism for simultaneously operating suitable escapement mechanisms, substantially as and for the purpose specified.

2. The combination of the spacer-magazines containing channels, the flat funnel-shaped assembling-tubes 72 movably suspended below said channels, the supplemental tubes 72ᶠ loosely mounted on the lower ends of said tubes 72, the assembling-trough, and mechanism for releasing said tubes 72 singly and permitting the supplemental tubes to enter the assembling-trough, substantially as and for the purpose specified.

3. The combination of the spacer-magazines, containing channels, the flat funnel-shaped assembling-tubes 72 movably suspended below said channels, the supplemental tubes 72ᶠ, the bar 79 for moving said tubes to the right, the pawl 78ᵃ, the bar 73 for lifting the front ends of said tubes, the assembling-trough, and escapement mechanism for releasing said tubes singly, substantially as and for the purpose specified.

4. The combination of the spacer-magazines containing channels, flat funnel-shaped assembling-tubes 72, suspended at their rear upper ends by loose pivots, and guided at their front upper ends, whereby the contracted lower ends of said tubes may move both forward and backward and to right and left, substantially as and for the purpose specified.

5. The combination of the spacer-magazines containing channels, flat funnel-shaped assembling-tubes suspended loosely at their rear upper ends beneath said channels and guided at their front upper ends, mechanism for temporarily preventing the movement of said tubes, and escapement mechanism for releasing said tubes singly, substantially as and for the purpose specified.

6. The combination of the flat funnel-shaped assembling-tubes, and the supplemental tubes open on their rear sides connected to the lower ends of said assembling-tubes, substantially as and for the purpose specified.

7. The combination of the slide 75 having ratchet-teeth $75^k$, the slide 76, an escapement pallet-lever 80 pivoted to slide 76 for engagement with the ratchet-teeth, a space-key for operating said pallet-lever and pawl, and springs for retracting said slides, and means for preventing the concurrent backward movement of slide 75, substantially as and for the purpose specified.

8. The combination of the slide 75 having ratchet-teeth $75^k$, the slide 76 having a tooth $76^c$, an escapement pallet-lever 80 pivoted to slide 76 for engagement with the ratchet-teeth, a pawl $78^d$ pivoted to a fixed support for engagement with said tooth $76^c$, a space-key for operating said pallet-lever and pawl, and springs for retracting said slides, a detent adapted to be moved by and in front of an assembling matrix-line, and arms on said detent and slide 75 which engage with each other, substantially as and for the purpose specified.

9. The combination of a plurality of spacer-magazines adapted to contain spacers of different thicknesses, and a gravity-sorter arranged above and in communication with the mouths of said magazines, for separating the different-sized spacers and discharging them into their respective magazines, substantially as and for the purpose specified.

10. The combination of a plurality of spacer-magazines adapted to contain spacers of different thicknesses, and arranged behind one another with their mouths in the same vertical plane, with a gravity-sorter having a single inlet mouth or opening, and a plurality of discharge-openings of different sizes, which openings are respectively connected with the several magazine-mouths, substantially as and for the purpose specified.

11. The combination of an inclined sorter-plate, having in its lower face a plurality of grooves of different depth which begin at a common point at the mouth of the sorter and diverge therefrom downward, said grooves being all inclined in the same direction to the vertical but at different progressively-greater angles, the shallowest groove being least inclined, and a smooth plate secured across the grooved face of said sorter-plate, with a plurality of magazines having their mouths beneath the lower ends of said grooves, substantially as and for the purpose specified.

12. In a device for sorting spacers of different thicknesses, a plate having in one face grooves of different depth, which grooves have their origin at a common point, and diverge therefrom until they are entirely separated, substantially as and for the purpose specified.

13. The combination of a plurality of magazines having their mouths arranged in a row, with a sorter consisting of a plate having in one side inclined grooves of different depth which discharge into the mouths of the magazines, which grooves converge and are merged together at their upper ends, substantially as and for the purpose specified.

14. The combination of a sorter having a mouth at its upper end and inclined grooves of different depth arranged progressively as to depth one behind another, which grooves begin at the mouth of the sorter and diverge from said point downward, the shallowest grooves being the least inclined, with magazines, the mouths of which are arranged beneath the lower ends of said sorter-grooves, substantially as and for the purpose specified.

15. The combination of a plurality of magazines arranged one behind another, each divided into vertical channels, the channels in the several magazines being arranged in rows, with assembling-tubes having wide mouths arranged severally beneath the rows of channels, substantially as and for the purpose specified.

16. The combination of a plurality of spacer-channels, their escapement mechanisms and spacers, with independent devices for actuating said escapements, and mechanism for operating any desired combination of said devices, substantially as and for the purpose specified.

17. The combination of a plurality of spacer-channels, their escapement mechanisms, and spacers, with independent escapement-operating devices, a plurality of different combination-rods adapted to operate any desired combination of said escapement-operating devices, substantially as and for the purpose specified.

18. The combination of a plurality of spacer-channels, escapement mechanism for each channel, an equal number of slotted rocker-plates, and mechanism connecting said rocker-plates and escapement mechanisms, with movable combination-rods which pass through slots in all of the plates and are arranged in rows coincident with said slots, all of the rods having laterally-projecting fingers for engagement with said plates, the fingers on all of the rods in any row being the same as to number but different as to arrangement, the number of fingers on different rods being different, substantially as and for the purpose specified.

19. The combination of a plurality of spacer-channels, an independent escapement for each channel, an equal number of rocker-plates, and connecting mechanisms, and a plurality of movable combination-rods each having a different combination of fingers for engagement with said rockers, substantially as and for the purpose specified.

20. The combination of a plurality of spacer-channels, escapements for said channels, a plurality of movable combination-rods each having a different combination of laterally-projecting fingers, and independent escapement-operating mechanisms, adapted to be actuated by said fingers, substantially as and for the purpose specified.

21. The combination of a plurality of spacer-channels, escapements for said channels, an equal number of escapement-operating mechanisms, and a plurality of movable combination-rods having laterally-projecting fingers which engage with said escapement-operating mechanisms, said rods being arranged in rows, the rods in each row having the same number of fingers, which fingers are differently arranged upon different rods, substantially as and for the purpose specified.

22. The combination of a plurality of spacer-channels, independent escapement mechanism for said channels, and a plurality of movable combination-rods having different combinations of fingers for operating said escapement mechanisms, substantially as and for the purpose specified.

23. The combination of a plurality of spacer-magazines, each of which contains a plurality of channels, which magazines are grouped one behind another with their channels arranged in rows, each row containing a plurality of channels but only one in any one magazine, substantially as and for the purpose specified.

24. The combination of a plurality of spacer-magazines grouped one behind another, each magazine being divided into channels which are arranged in rows including channels in different magazines, an independent escapement for each channel and assembling-tubes supported severally beneath said rows of channels, substantially as and for the purpose specified.

25. The combination of a spacer-magazine having a single mouth, ribs which divide the magazine into channels, and a switch adapted to be operated by the entry of a spacer into one channel whereby the next spacer which enters the mouth of the magazine must enter a different channel, substantially as and for the purpose specified.

26. The combination of a spacer-magazine having a contracted mouth, ribs which divide the magazine into spacer-channels, and an automatic switch-lever having its upper end normally in the path of a spacer falling through said mouth, and its lower end extended diagonally across a spacer-channel, substantially as and for the purpose specified.

27. The combination of a spacer-magazine having a contracted mouth, one approximately vertical wall and one wall which diverges therefrom at its upper end, and ribs which divide the lower part of the magazine with a plurality of spacer-channels, with automatic switch-levers pivoted in said magazine having long upper arms, which fall by gravity into contact with said vertical wall, and short arms which extend diagonally across said channels, substantially as and for the purpose specified.

28. The combination of a spacer-magazine divided into a plurality of channels, an equal number of horizontally-movable slides which lie in grooves in the wall of said magazine, each slide having a finger which projects into one of the channels, substantially as and for the purpose specified.

29. The combination of a plurality of spacer-magazines, each of which is divided into vertical channels, an independent escapement-slide for each channel, corresponding bell-crank levers for operating said escapement-slides, corresponding rocker-plates for operating said bell-crank levers, which rocker-plates are arranged one above another and are provided with slots extending toward their pivots, with a plurality of movable combination-rods extending through said slots and having different combinations of fingers adapted to engage with said rocker-plates, substantially as and for the purpose specified.

30. The combination of a series of rocker-plates arranged one above another, having a plurality of slots arranged in common vertical planes at right angles to their pivots, and escapement mechanisms operated by said several rocker-plates, with a plurality of combination-rods which extend through said slots and are arranged in rows coincident with said slots, rods having laterally-projecting fingers adapted to engage with and operate said rocker-plates, all of the rods in the first row having the same number of fingers but differently arranged, and each succeeding row having one more finger than the one next in front of it, substantially as and for the purpose specified.

31. The combination of a plurality of combination-rods having laterally-projecting fingers, which rods are arranged in rows, each rod in any row having the characteristic number of fingers of said row, which fingers on the different rows are differently arranged, in combination with the push-rod adapted to be moved from one row to another and along any of the rows, and mechanism for moving said push-rod up to operate the combination-rod above it, substantially as and for the purpose specified.

32. The combination of the spacer-channels and independent escapement mechanisms for said channels, and the combination-rods 66 arranged substantially as described, with a push-rod mounted on a universal joint on a vertically-movable arm, two slides 75, 76, the two plates 75ª 76ª secured respectively to said slides and adapted to engage with and operate the lower end of said push-rod, the spacer-assembling tubes which are adapted to be introduced into a line of type or matrices as it is being assembled, mechanism for advancing the slide 75 alone, whenever a spacer-tube is added to the line, a distance equal to the width of such tube, and mechanism for advancing both slides when matrices or type are added to the line a distance equal to such addition, substantially as and for the purpose specified.

33. A spacer having parallel sides, and having, in its upper end, a dovetailed notch, and, in its lower end a notch which is not dovetailed, substantially as and for the purpose specified.

34. The combination of a plurality of spacer-assembling tubes suspended from their upper ends and adapted to swing forward and backward and to right and left, a pawl engaging with the left tube, thereby preventing it from swinging to the left, and a movable arm engaging behind the left tube, thereby preventing its rearward movement, a space-key for moving this arm, and an assembling-trough having a slot in its front wall behind the left trough, substantially as and for the purpose specified.

35. A spacer-assembling tube having a contracted lower end and an open wide upper end, and the ear $72^c$ which is vertically slotted, and the ear $72^d$, both ears being connected with the front side of the lower end of said tube, combined with a supplemental tube having a rod $72^k$ which passes through the slotted ear $72^c$ and is loosely attached to the ear $72^d$, substantially as and for the purpose specified.

In testimony whereof I affix my signature in presence of two witnesses.

BENJ. F. BELLOWS.

Witnesses:
JAS. W. STEWART,
E. L. THURSTON.